Feb. 3, 1953 A. STEINER 2,627,288
BAND SAW ATTACHMENT FOR MACHINE TOOLS
Filed Nov. 29, 1949 3 Sheets-Sheet 1

INVENTOR.
Alois Steiner
BY Victor J. Evans & Co.
ATTORNEYS

Feb. 3, 1953 — A. STEINER — 2,627,288
BAND SAW ATTACHMENT FOR MACHINE TOOLS
Filed Nov. 29, 1949 — 3 Sheets-Sheet 2
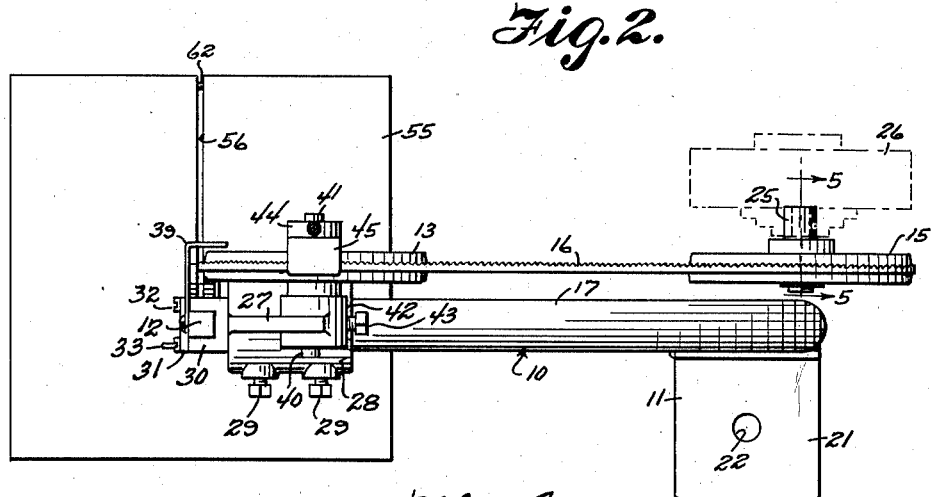
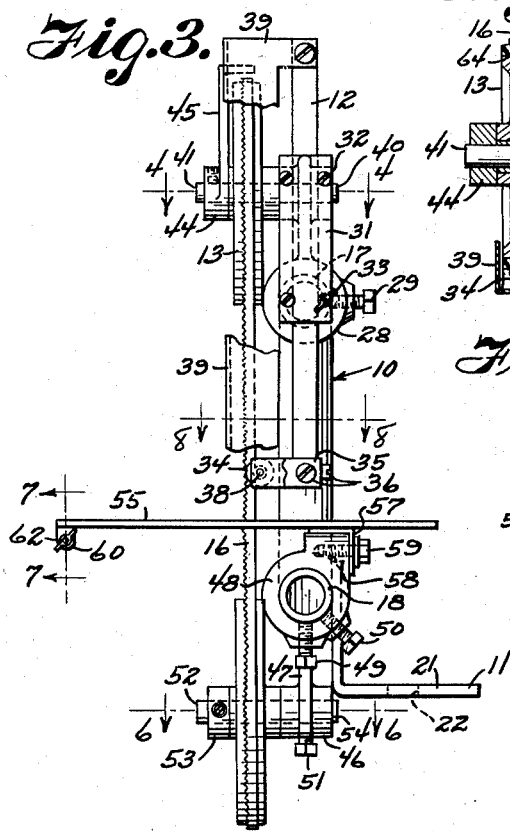
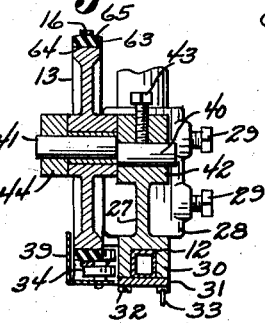
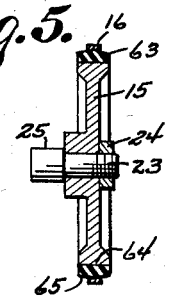
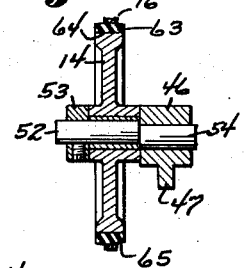
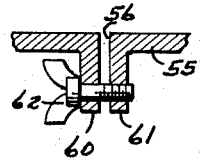
INVENTOR.
Alois Steiner
BY Victor J. Evans & Co.
ATTORNEYS Feb. 3, 1953  A. STEINER  2,627,288
BAND SAW ATTACHMENT FOR MACHINE TOOLS
Filed Nov. 29, 1949  3 Sheets-Sheet 3

INVENTOR.
Alois Steiner
BY Victor J. Evans & Co.
ATTORNEYS

Patented Feb. 3, 1953

2,627,288

UNITED STATES PATENT OFFICE 2,627,288

BAND SAW ATTACHMENT FOR MACHINE TOOLS

Alois Steiner, Hoboken, N. J.

Application November 29, 1949, Serial No. 129,950

2 Claims. (Cl. 143—17)

This invention relates to band saws, and in particular a band saw formed with an attachment that may be removably mounted on the bed of a lathe with the band saw trained over a pulley on the lathe spindle.

The purpose of this invention is to provide an attachment for readily converting a lathe into a band saw in which the attachment may be mounted upon a lathe or removed therefrom in a comparatively short period of time.

Various attachments have been provided for lathes and various means have been used for forming band saws but where floor space is at a premium and particularly for domestic shops it is advisable to extend the use of a machine tool whereby it may be used for different purposes. With this thought in mind this invention contemplates a U-shaped frame adapted to be mounted in a horizontal position on the bed of a lathe with a saw table positioned between the open end, with a saw driving pulley positioned on the spindle of the lathe and with pulleys and guide means carried by the outer extended ends of the frame.

The object of this invention is, therefore, to provide means for constructing an attachment that may readily be mounted on a lathe whereby a band saw may be trained therethrough and operated for use by the lathe.

Another object of the invention is to provide a band saw in the form of an attachment for a lathe that may readily be mounted upon lathes of different types and sizes.

Another object of the invention is to provide a portable band saw that may be used as an attachment on a lathe or mounted on an independent base, and driven from a lathe spindle, motor, or other means.

A further object of the invention is to provide a band saw attachment that may be mounted on and operated by a lathe which is of a simple and economical construction.

With these and other objects and advantages in view the invention embodies a horizontally disposed U-shaped frame mounted through the closed end thereof on the bed of a lathe with a vertically slidable stud carried by the upper bar of the frame, a table adjustably mounted on the lower bar of the frame, pulleys mounted on both the upper and lower bars of the frame, and a band saw trained over the said pulleys and over the pulley on the lathe spindle.

Other features and advantages of the invention will appear from the following description taken in connection with the drawings wherein:

Figure 2 is a plan view of the attachment illustrated in Figure 1 with the lathe omitted and with the chuck thereof indicated in dotted lines.

Figure 3 is an end elevational view showing the band saw attachment with parts broken away.

Figure 4 is a cross section through the attachment taken on line 4—4 of Figure 3.

Figure 5 is a vertical section through the pulley adapted to be mounted on a lathe being taken on line 5—5 of Figure 2.

Figure 6 is a cross section taken on line 6—6 of Figure 3 showing the lower band and pulley.

Figure 7 is a detail showing a section on line 7—7 of Figure 3 looking away from the attachment wherein the head of the thumb screw is on the outer side thereof.

Figure 1:
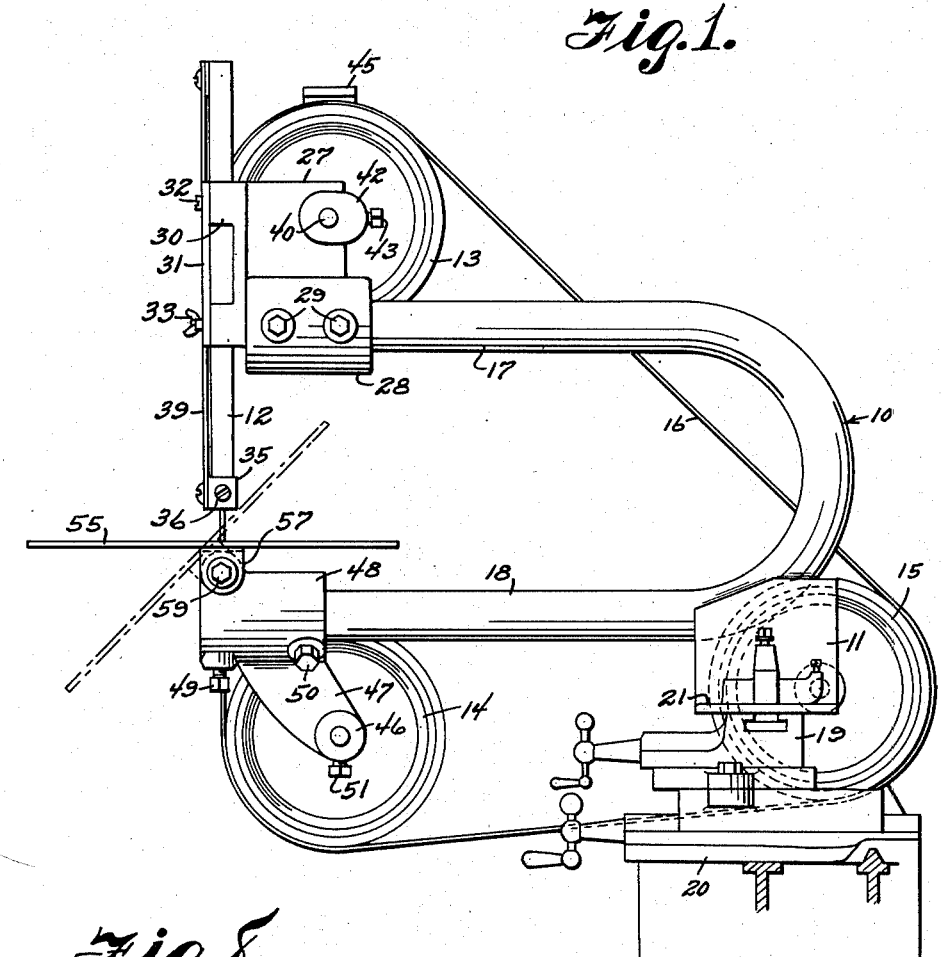
Figure 1 is a side elevational view of the attachment showing the attachment mounted on the lathe bed.

Referring now to the drawings wherein like reference characters denote corresponding parts the band saw lathe attachment of this invention includes a horizontally disposed U-shaped frame 10 having a mounting bracket 11, a vertically disposed tubular post 12, an upper pulley 13, a lower pulley 14, a spindle pulley 15 and a band saw 16.

The frame 10 is formed with a base having outwardly extended arms 17 and 18 and although the base is illustrated as being arcuate or semi-circular it will be understood that the horizontally disposed arms may be connected by a vertical member or base of any shape. The frame is mounted through the bracket 11 on the tool holder 19 of a lathe bed 20 through a flange 21 with a bolt hole 22 therein.

The pulley 15 is mounted on a stud 23 as shown in Figure 5 with a lock nut 24 on the outer end and the stud is provided with a base 25 by which it is clamped in a chuck 26 of the lathe.

Figure 8:
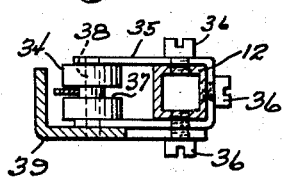
Figure 8 is a cross section on line 8—8 of Figure 3 showing the vertically adjustable saw guide.

The tubular post 12 is mounted on the upper bar 17 of the frame through a bracket or head 27 which is provided with a hub or sleeve 28 that is clamped on the bar by bolts 29. The post is clamped in a socket 30 of the bracket by a plate 31 which is held by screws 32. A thumb screw 33 is provided in the lower part of the plate and by loosening the thumb screw the post may be adjusted vertically to adjust the position of a guard roller 34 that is journaled on the lower end of the post through a bracket 35. The bracket is secured to the end of the post by cap screws 36 as illustrated in Figure 8, and the guard roller 34 is provided with an annular saw receiving slot 37. The roller 34 is rotatably mounted on a pin 38 and an L-shaped guard 39 is provided on one side of the bracket with the extended end thereof positioned to retain the saw in the slot of the roller.

The upper part of the bracket 27 is formed as illustrated in Figure 4 wherein a stud 40 with a pulley shaft 41 eccentrically positioned on the end thereof is mounted in a hub 42 and secured in position by a set screw 43. The pulley 13 is journaled on the shaft 41 and a hub 44 is carried by the outer end of the shaft. The hub 44 is provided with an upwardly extended L-shaped arm 45 which extends upwardly with the end thereof positioned over the upper surface of the pulley 13.

The lower pulley 14 is journaled in a hub 46 at the lower end of an arm or bracket 47 extended downwardly from a hub 48 that is mounted on the lower bar 18 of the frame and secured to the bar by set screws 49 and 50. A set screw 51 is provided in the hub 46 for holding the shaft 52 on which the pulley 14 is journaled and a set collar 53 is provided on the outer end of the shaft for holding the pulley. The shaft 52 is also eccentrically positioned in relation to the supporting hub and the shaft is carried by a stud 54 on which it is eccentrically mounted as illustrated in Figure 6.

A saw table 55, having a slot 56 therein is adjustably mounted on the outer end of the hub 48 by a clip angle 57 which is attached to a lug 58 on one side of the hub 48 by a bolt 59. The saw table may be adjusted about the center of the bolt 59 as indicated by the dotted lines shown in Figure 1 wherein the saw may cut through wood or other material at an angle. The outer edge of the saw table is provided with downwardly extended ears 60 and 61 that are positioned on opposite sides of the slot 56 and a thumb screw 62 extends through the ear 60 and is threaded into the ear 61 for providing and imparting stability to the saw table.

Suitable guards may be provided to cover the saw and these may be extended around the pulleys and as illustrated in Figures 3 and 4 the L-shaped guard 39 shown in Figure 8 extends upwardly to cover the vertically disposed section of the saw.

With the parts arranged in this manner the band saw attachment may be stored in a suitable cabinet or on a shelf and when it is desired to use a lathe for sawing the attachment is bolted on the bed of the lathe as illustrated in Figure 1 and the pulley 15 mounted upon the spindle or held in the chuck. The shafts of the upper and lower pulleys are made eccentric for providing means of centralizing the saw blade in relation to the slot in the saw guide roller. This pulley may also be formed as illustrated in Figures 4, 5 and 6 with a band 63 of rubber or other resilient material secured on the outer face of a rim 64 and provided with an arcuate outer surface 65 upon which the saw is carried and with the saw mounted in this manner wood or other materials may be cut on the table.

Figure 9:
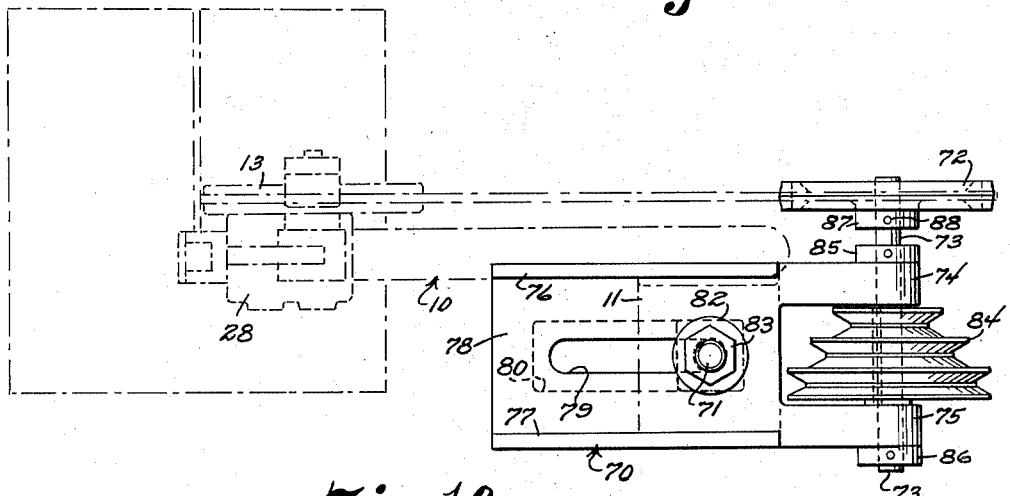
Figure 9 is a plan view illustrating a mounting base on which the attachment may be supported for use as a portable band saw and showing the attachment in dot and dash lines.
Figure 10:
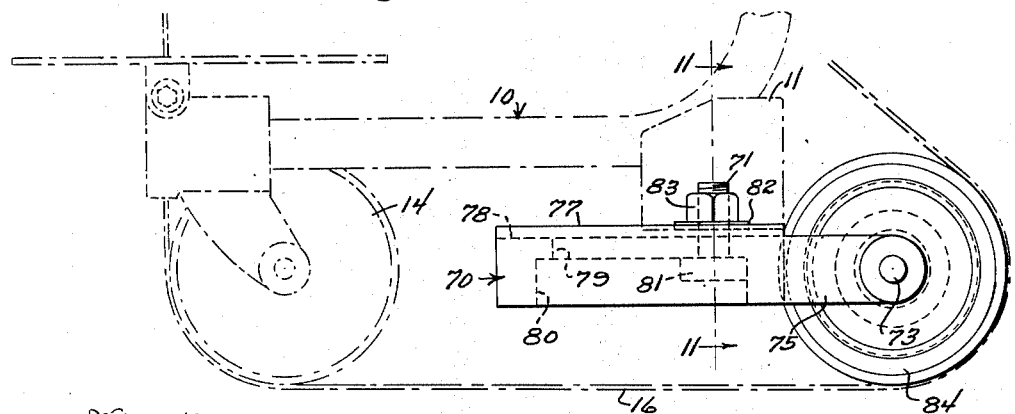
Figure 10 is a side elevational view of the mounting base shown in Figure 9 and also illustrating the attachment in dot and dash lines.
Figure 11:
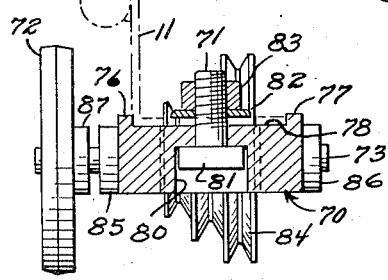
Figure 11 is a cross section through the mounting base taken on line 11—11 of Figure 10.

This device is also adapted for use as a portable band saw wherein the U-shaped member 10 is supported through the clip angle 11 on a base 70 as shown in Figures 9 and 10 with the clip angle secured to the base by a stud 71 and with a pulley 72, similar to the pulley 15 carried on a shaft 73 which is journaled in the outer ends of arms 74 and 75 extended from the outer end of the base.

The base 70 is provided with beads 76 and 77 at the edges which provide a recess 78 in which the base of the angle 11 is positioned, and the intermediate part of the base is provided with an elongated slot 79 through which the stud 71 extends, and the under surface of the base is provided with a recess 80 in which the head 81 of the stud is positioned. The stud is provided with a washer 82 and a lock nut 83 whereby the position of the mounting base in relation to the band saw bracket may readily be adjusted.

The shaft 73 is provided with cone pulleys 84 by which the band saw, through the shaft 73 may be driven from corresponding pulleys on a lathe spindle, or from a motor, or by any suitable means. The shaft is provided with set collars 85 and 86 and the pulley 72 is provided with a hub 87 through which it is secured on the shaft by a set screw 88.

The base 70 may be of any suitable type or design whereby the portable band saw may be supported on machine tools or on a bench or table, or stand or supporting elements of any suitable type.

It will be noted that with the band saw attachment positioned on a lathe as shown in Figure 1 the blade of the saw may be tightened by the cross feed of the lathe and with the attachment mounted on a milling machine the cross feed of the milling machine may be used to tighten the saw blade.

It will be understood that other modifications may be made in the design and arrangement of the parts without departing from the spirit of the invention.

What is claimed is:

1. In a band saw attachment for use on machine tools, the combination which comprises a U-shaped tubular frame having spaced horizontally positioned upper and lower arms connected at one end with an arcuate base and positioned in a vertical plane, a hub slidably mounted on said lower arm, means securing said hub in position on said arm, a clip angle pivotally mounted on said hub, a saw table having a saw slot extended inwardly from one edge carried by said clip angle, said hub having a bracket extended downwardly therefrom, a saw carrying pulley journaled in the bracket extended downwardly from the hub and positioned at one side of the lower arm of the U-shaped frame, a sleeve slidably mounted on the upper arm of the U-shaped frame, means securing the sleeve in position on said arm, said sleeve having a plate extended upwardly therefrom with a vertically disposed socket in an extended edge providing a head, a saw carrying pulley journaled in said head, positioned at one side of the U-shaped frame and in a plane extended through the saw carrying pulley on the hub of the lower arm of the frame, a tubular post adjustably mounted in the vertically disposed socket of the head, means clamping the post in adjusted position, band saw guide elements carried by said post, a mounting bracket extended downwardly from the lower arm of the U-shaped frame and positioned at the lower end of the arcuate base of the frame, and a third saw carrying pulley adapted to be positioned on a rotating element of a machine on the frame of which the U-shaped frame is mounted.

2. In a band saw attachment for use on machine tools, the combination which comprises a U-shaped tubular frame having spaced horizontally positioned upper and lower arms connected at one end with an arcuate base and positioned in a vertical plane, a hub slidably mounted on said lower arm, means securing said hub in position on said arm, a clip angle pivotally mounted on said hub, a saw table having a saw slot extended inwardly from one edge carried by said clip angle, said hub having a bracket extended downwardly therefrom, a saw carrying pulley journaled in the bracket extended downwardly from the hub and positioned at one side of the lower arm of the U-shaped frame, a sleeve slidably mounted on the upper arm of the U-shaped frame, means securing the sleeve in position on said arm, said sleeve having a plate extended upwardly therefrom with a vertically disposed socket in an extended edge providing a head, a saw carrying pulley journaled in said head, positioned at one side of the U-shaped frame and in a plane extended through the saw carrying pulley on the hub of the lower arm of the frame, a tubular post adjustably mounted in the vertically disposed socket of the head, means clamping the post in adjusted positions, band saw guide elements carried by brackets extended laterally from the upper and lower ends of said post, a guard also carried by said brackets, a mounting bracket extended downwardly from the lower arm of the U-shaped frame and positioned at the lower end of the arcuate base of the frame, and a third saw carrying pulley adapted to be positioned on a rotating element of a machine on the frame of which the U-shaped frame is mounted.

ALOIS STEINER.

REFERENCES CITED

The following references are of record in the file of this patent:

UNITED STATES PATENTS

| Number | Name | Date |
|---|---|---|
| 120,949 | Doane et al. | Nov. 14, 1871 |
| 511,618 | Hurteau | Dec. 26, 1893 |
| 1,499,124 | Reichmann | June 24, 1924 |
| 1,769,656 | Sullenberger | July 1, 1930 |
| 1,973,409 | Evinrude | Sept. 11, 1934 |
| 2,064,605 | Hirtz | Dec. 15, 1936 |
| 2,127,745 | Lochman | Aug. 23, 1938 |

FOREIGN PATENTS

| Number | Country | Date |
|---|---|---|
| 549,029 | France | 1922 |
| 191,833 | Great Britain | Jan. 26, 1923 |